(12) United States Patent
Virkler et al.

(10) Patent No.: US 6,528,591 B2
(45) Date of Patent: Mar. 4, 2003

(54) PROCESS FOR PREPARING EXTRUSION GRADE ABS POLYMER

(75) Inventors: Terry L. Virkler, Ellington, CT (US); Wan C. Wu, Longmeadow, MA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/835,696

(22) Filed: Apr. 16, 2001

(65) Prior Publication Data

US 2001/0031827 A1 Oct. 18, 2001

Related U.S. Application Data

(63) Continuation-in-part of application No. 09/473,169, filed on Dec. 28, 1999, now abandoned.

(51) Int. Cl.[7] .............................................. C08F 255/00
(52) U.S. Cl. ...................................... 525/243; 525/316
(58) Field of Search ................................. 525/243, 316

(56) References Cited

U.S. PATENT DOCUMENTS

| | | | |
|---|---|---|---|
| 3,243,481 A | 3/1966 | Ruffing et al. | 260/880 |
| 3,337,650 A | 8/1967 | Marcil | 260/880 |
| 3,438,971 A | 4/1969 | Walker | 260/23.7 |
| 3,511,895 A | 5/1970 | Kydonieus et al. | 260/876 |
| 4,417,030 A | 11/1983 | Aliberti et al. | 525/316 |
| 5,166,261 A | 11/1992 | Wu et al. | 525/53 |
| 5,286,792 A | 2/1994 | Wu et al. | 525/84 |
| 6,114,461 A | * 9/2000 | Preti et al. | 525/298 |

FOREIGN PATENT DOCUMENTS

EP          474 618          3/1992

* cited by examiner

*Primary Examiner*—Jeffrey Mullis
(74) *Attorney, Agent, or Firm*—Joseph C. Gil; Aron Preis; John E. Mrozinski

(57) ABSTRACT

A continuous mass polymerization process for making an extrusion grade ABS resin having desirable properties and suitable for making refrigerator liners is disclosed. The process comprise charging a reaction mixture into a first in a series of reactors under conditions promoting polymerization, the mixture comprising diene rubber, a mixture of monomers, inert solvent and a chemical initiator to form a reaction mixture. The mixture is then transferred into a subsequent reactor operating at a temperature of 130 to 155° C. with no addition of chemical initiator and the resulting product is then devolatilized. The ABS thus produced contains about 10 to 16 pbw of dispersed rubber particles having an average particle diameter of 0.3 to 0.7 microns.

2 Claims, No Drawings

PROCESS FOR PREPARING EXTRUSION GRADE ABS POLYMER

This application is a Continuation-In-Part of U.S. Ser. No. 09/473,169 filed Dec. 28, 1999 now abandoned.

FIELD OF THE INVENTION

The invention relates to a process for making extrusion grade ABS polymers, more particularly, a continuous mass polymerization process.

SUMMARY OF THE INVENTION

A continuous mass polymerization process for making an extrusion grade ABS resin having desirable properties and suitable for making refrigerator liners is disclosed. The process comprise charging a reaction mixture into a first in a series of reactors under conditions promoting polymerization, the mixture comprising diene rubber, a mixture of monomers, inert solvent and a chemical initiator to form a reaction mixture. The mixture is then transferred into a subsequent reactor operating at a temperature of 130 to 155° C. with no addition of chemical initiator and the resulting product is then devolatilized. The ABS thus produced contains about 10 to 16 pbw of dispersed rubber particles having an average particle diameter of 0.3 to 0.7 microns.

BACKGROUND OF THE INVENTION

ABS polymer materials are known and have long found utility in a wide variety of applications. Thermoplastic compositions, most notably extrusion grades, containing ABS polymers alone or in conjunction with other resinous components are commercial products that are globally available. Refrigeration components, most notably refrigerator liners are one industry segment where ABS polymers have found considerable acceptance.

In its continued search for improvements, the refrigeration industry has been seeking material systems having a particularly desirable balance of properties; no single property renders a material system suitable for this demanding application. Material having such desirable properties would feature a high level of mechanical properties and good processability. Such desirable material would meet certain values of shear viscosity, tensile modulus, elongation-to-fail, resistance to impact, melt strain hardening and melt strain at the onset of visible necking. The melt strain hardening (stress growth) and strain to onset of visible necking are properties indicating the stability of the melt under high strains and are predictive of the uniformity of the thickness of parts that are thermoformed at high draw ratios. The materials that are currently available, although meeting some of the desirable properties, fall short in respect to others.

The ABS polymers of the current invention are preferably produced by continuous mass polymerization. Continuous mass polymerization is a well-known process for making ABS polymers. The process has been disclosed in, among others, U.S. Pat. Nos. 3,243,481, 3,337,650, 3,511,895 and 4,417,030, the specifications of which are incorporated herein by reference. U.S. Pat. No. 3,438,971, wherein a mixture of a diene-rubber-nitrile copolymer with unsaturated triglycerides is disclosed, is presently relevant.

DETAILED DESCRIPTION OF THE INVENTION

In the present context, the term "ABS polymers" refers to the genus entailing (i) a grafted diene rubber wherein grafted phase comprises the (co)polymerization product of a monoalkenyl aromatic monomer (exemplified by and sometimes referred to below as "styrene") and an ethylenically unsaturated nitrile monomer (exemplified by and sometimes referred to below as "acrylonitrile") and (ii) a matrix which comprises the (co)polymerization product of a monoalkenyl aromatic monomer and an ethylenically unsaturated nitrile monomer (hereinafter exemplified by and referred to as "SAN").

The monoalkenyl aromatic monomer may be represented as

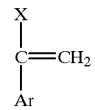

wherein Ar is selected from the group consisting of phenyl, halophenyl, alkylphenyl and alkylhalophenyl and mixtures thereof and X is selected from the group consisting of hydrogen methyl and ethyl groups.

Exemplary of the monoalkenyl aromatic monomers that can be employed in the present invention are styrene and substituted styrenes such as the o-, m-, and p-methyl styrenes, 2,4-dimethylstyrene, the corresponding ethyl styrenes, p-tert-butyl styrene, alpha-methyl styrene, alphaethylstyrene, alpha ethyl-p-methylstyrene, vinyl naphthalene, an ar-halo monoalkenyl aromatic monomer such as o-chlorostyrene, m-chlorostyrene, p-chlorostyrene, o-bromostyrene and 2,4-dibromostyrene, and ring-alkyl, ring-halo-substituted styrenes, e.g., 2-methyl-4-chlorostyrene and 2,6-dichloro-4-methylstyrene. Mixtures of monoalkenyl aromatic monomers may also be used.

Exemplary of the unsaturated nitriles or alkenyl nitrile monomers which may be used are acrylonitrile, methacrylonitrile, ethacrylonitrile and mixtures thereof.

Optional additional monomers may be polymerized along with the monoalkenylaromatic monomer and unsaturated nitrile monomer. These include alpha- or beta-unsaturated mono-basic acids and derivatives thereof, e.g., acrylic acid, methyl acrylate, ethyl acrylate, butyl acrylate, 2-ethylhexyl acrylate, methacrylic acid and the corresponding esters thereof, such as methyl methacrylate, acrylamide and methacrylamide; vinyl halides such as vinyl chloride, vinyl bromide and vinylidene chloride, vinylidene bromide; vinyl esters such as vinyl acetate and vinyl propionate, dialkyl maleates or fumarates such as dimethyl maleate, diethyl maleate, dibutyl maleate; and maleic anhydride.

The mixture of monomers used in the inventive process comprise at least 40%, preferably at least 50%, relative to the weight of the mixture of the monoalkenylaromatic monomer. The mixture also contains at least 5%, preferably at least 10%, relative to the weight of the mixture of the unsaturated nitrile. In practice, it is desirable that the monomer mixture contains 40 to 95% and preferably 60 to 85%, by weight of the alkenyl aromatic hydrocarbon and 60 to 5% and preferably 60 to 15% and most preferably from 60 to 25% by weight of the unsaturated nitrile.

The rubber suitable in the present invention is at least one conjugated diene rubber having a glass transition temperature of at most −85° C. as determined by ASTM Test D-746-52T, selected from among 1,3-dienes, e.g., butadiene, isoprene, 2-chloro-1,3-butadiene, 1-chloro-1,3-butadiene, piperylene, etc. Also suitable are copolymers and block copolymers of conjugated 1,3-dienes with up to an equal amount by weight of one or more copolymerizable monoethylenically unsaturated monomers, including monoalkenyl aromatic hydrocarbons such as styrene and substituted styrenes such as aralkylstyrenes, including o-, m- and p-methylstyrenes, 2,4-dimethylstyrene, the corresponding ar-ethylstyrenes, p-tert-butylstyrene, etc.; alphamethylstyrene, alphaethyl-styrene; alphamethyl-p-methyl styrene, vinyl naphthalene; arhalomono-alkenyl aromatic hydrocarbons such as o-, m- and p-chlorostyrene, 2,4-dibromostyrene, and 2-methyl-4-chlorostyrene; acrylonitrile, methacrylo-nitrile; ethacrylonitrile; alpha or beta-unsaturated mono-basic acids and derivatives thereof, e.g., acrylic acid, methyl acrylate, ethyl acrylate, butyl acrylate, 2-ethylhexyl acrylate, methacrylic acid and the corresponding esters thereof, such as methyl methacrylate, acrylamide and methacrylamide; vinyl halides such as vinyl chloride, vinylidene bromide; vinyl esters such as vinyl acetate and vinyl propionate, dialkyl maleates or fumarates such as dimethyl maleate, diethyl maleate, dibutyl maleate; and maleic anhydride.

A useful group of rubbers are the stereo-specific polybutadiene rubbers formed by the polymerization of 1,3-butadiene. These rubbers have a cis-isomer content of about 30 to 98% and a trans-isomer content of about 70 to 2%. A preferred group of rubbers are those consisting essentially of 75 to 100% by weight of butadiene and/or isoprene and up to 25% by weight of a monomer selected from the group consisting of monovinylidene aromatic hydrocarbons (e.g., styrene) and unsaturated nitriles (e.g., acrylonitrile), or mixtures thereof. The diene rubber may contain crosslinking agent in an amount of up to about 2% based on the weight of the rubber monomer or monomers. The crosslinking agent may be any of the agents conventionally employed for crosslinking diene rubbers, e.g., divinylbenzene, diallyl maleate, diallyl fumarate, diallyl adipate, allyl acrylate, allyl methacrylate, diacrylates and dimethacrylates or polyhydric alcohols, e.g., ethylene glycol dimethacrylate, etc.

The rubber content of the inventive ABS polymer is about 10 to 16%, preferably 12 to 15% relative to the weight of the ABS polymer.

In carrying out the polymerization by continuous mass process where a number of reactors are entailed, a monomer mixture comprising principally monoalkenylaromatic monomer and an ethylenically unsaturated nitrile monomer will polymerize readily to form copolymers of the matrix phase in the presence of a dispersed rubber phase. Optionally, minor proportions of other monomers may be present in the copolymer. The copolymer in the partially polymerized mixture is formed as a free, or matrix phase polymer and as a polymer grafted on the diene rubber particles. These matrix phase and grafted copolymers will have about the same composition for a given formulation.

The rubber content of the solution fed to the first reactor of the present invention can be a positive amount up to 15%, preferably up to 12%, by weight.

In carrying out the polymerization by continuous mass process, the polymerization is initiated in the first reactor by any free radical generating initiator that promotes grafting and is activated at the contemplated reaction temperatures (herein referred to as chemical initiator or initiator). Suitable initiators include peresters and peroxycarbonates such as tert-butyl perbenzoate, tert-butyl peroxy isopropyl carbonate, tert-butyl peroctoate, tert-butyl peroxy isononoate, tert-butyl 2-ethylhexyl monoperoxy carbonate, tert-butyl peroxy neodecanoate, and mixtures thereof. The initiator is generally included in an amount of 0.001 to 3.0%, preferably 0.005 to 1.0%, relative to the weight of the polymerizable material most preferably, the initiator is added along with the charge to the first in a series of reactors in an amount of 0.02 to 0.05% relative to the weight of the charge. No chemical initiator is added to any subsequent reactor in the process of making the inventive ABS polymer by continuous mass polymerization.

The acrylonitrile monomer is charged to the reactor in an amount such that the partially polymerized mixture in the first reactor contains about 15 to 60% by weight of acrylonitrile based on the total monomers charged. This will cause the ABS polymer to be higher in acrylonitrile content, bringing it into a preferred range of about 20 to 25% by weight.

As is well known, it is often desirable to incorporate molecular weight regulators such as mercaptans, halides and terpenes in relatively small amounts, on the order of 0.001 to 1.0% by weight of the polymerizable material. In addition, it may be desirable to include relatively small amounts of antioxidants or stabilizers such as the conventional alkylated phenols. Alternatively, these may be added during or after polymerization. The formulation may also contain other additives such as stabilizers, plasticizers, lubricants, colorants and non-reactive preformed polymeric materials which are suitable or dispersible therein.

In making the inventive ABS polymer by the continuous mass polymerization process, it is preferred to use at least two reactors operating continuously and in series. In this process, it is essential that all reactors subsequent to the first reactor are at temperatures in the range of 110 to 155° C. and that no chemical initiator is added subsequent to the first reactor.

Accordingly, the rubber in solution of the monomer mixture is fed continuously into a first reactor under conditions promoting polymerization along with at least one inert solvent to form a first reaction mixture in which the rubber dispersed phase has weight average particle diameter ($D_w$) of 0.3 to 0.7 microns.

The first reaction mixture is then transferred to at least one subsequent reactor along with an additional mixture of monomers, at least one subsequent reactor operates at a temperature lower than 155° C. preferably 130° C., to form a product. The product is devolatilized in a subsequent step.

Suitable inert solvents include methyl ethyl ketone, benzene, ethyl benzene and toluene.

A yet additional embodiment relating to the present invention concerns the advantageous cavitation resulting upon the incorporation of silicone oil in ABS polymer, preferably the ABS polymer prepared by continuous mass polymerization. As is well known to the art-skilled, cavitation is the process whereby a void is formed in the rubber particles upon being subjected to tensile stress. The capacity of the ABS to thus cavitate is desirable because cavitation relieves the rubber of hydrostatic tension and allows the rubber to craze the surrounding matrix at lower tensile stress. In other words, cavitation reduces the tensile yield stress, with the concurrent increase in toughness and in ETF. Cavitation does not reduce the modulus of the material.

The preparation of cavitatable rubber in accordance with the invention comprises adding silicone oil to the ABS polymer in an amount of about 0.05 to 0.4 percent, relative to the weight of the ABS polymer. The suitable silicone oil is siloxane polymer, including block copolymers containing polysiloxane blocks, for instance, polyether-polysiloxane and including polydialkyl siloxane, preferably polydimethyl siloxane having a viscosity of about 100 to 1,000,000 centistokes (cs). Cavitation, in accordance with the invention, is most effective in ABS polymer, wherein the diameter of the rubber particles (weight average diameter) is generally not larger than 0.7 microns.

The point of addition of silicone oil to the ABS polymer is not critical, and may be carried out during the polymerization process, before or after devolatilization.

This embodiment of the invention, the rendering of ABS polymer cavitatable is independent of the process parameters that were noted above; in other words, this embodiment does require refraining from adding chemical initiators to subsequent reactors, or the noted process temperatures.

In the preferred continuous mass polymerization process, the reaction is carried out in two reactors, the first, A, being stirred so as to yield a reaction mixture with a substantially uniform composition throughout and operating at 20 to 30% polymer solids content and the second reactor, B, being a continuous mass reactor operating at 50 to 70% polymer solids content. This preferred process is now set forth in more detail.

A first partially polymerized mixture is formed in Reactor A by simultaneously and continuously charging to the reactor: (1) a solution of styrene monomer, acrylonitrile monomer, an inert solvent, chemical initiator and optionally other additives, having dissolved therein about 7 to 15% by weight of a diene rubber having a molecular weight ($M_w$) of from 80,000 to 250,000. The reactor operates at about 20 to 30% steady state monomer to polymer conversion (from 20 to 30% polymer solids content), such that the rubber becomes dispersed directly on addition as rubber particles having a weight average particle diameter of about 0.3 to 0.7 microns. The distribution of the rubber phase (that is the ratio of the weight average particle diameter ($D_w$) to the number average particle diameter ($D_n$)), which is a critical parameter of the inventive ABS polymer, is preferably at most 2.2.

The monomers are polymerized at temperatures of from about 75° to 85° C. and at an operating pressure of from 1 to 10 atm. and at least a portion of the monomers polymerized are grafted as superstrate copolymer molecules on the diene rubber.

Upon completion of the reaction that takes place in the first reactor, the rubber particles have been formed, dispersed and grafted. Some monomer/polymer phase is often occluded in the rubber particles. The amount of such occluded monomer-polymer phase is held at a constant level by steady state polymerization. It has been found that the higher the volume of occlusion within the rubber particle the more efficiently the rubber phase is used in toughening the polymer. The rubber particle acts much as a pure rubber particle if the occlusions are controlled at a level of about 0.25 to 2.5 parts by weight per one part of rubber. The occluded monomers also polymerize and begin to form monomer/polymer components inside the rubber particles.

The rubber particle is also grafted externally, stabilizing its structure as to size and its dispersability in the monomer-polymer phase. The initial reactor forms a first partially polymerized mixture of a monomer-polymer phase having the rubber phase described above dispersed therein.

The second, or subsequent, reactor is preferably a continuous stirred reactor of the type used as the first reactor and is used to carry the conversion up to the desired level which is generally from 50 to 90%, preferably 60 to 80%, monomer to polymer and up to 75% polymer solids in the reaction mixture.

This reactor (Reactor B) operates with no further addition of chemical initiators, at temperatures of 130° to at most 155° C. and an operating pressure of from 5 to 10 atmospheres. The polymerization reaction is exothermic and cooling may be provided by vaporization of a part of the monomer from the reacting mass. However, if the target composition is above the S/AN azeotrope, it may be necessary to maintain the desired monomer proportions in Reactor B by use of a separate feed of monomers in the appropriate concentrations. Additionally, or alternatively, cooling can be provided by reactor jackets. Cooling by feeding the condensed recycle monomer into Reactor B may also be provided. It may also be appropriate to use as Reactor B a continuous flow-through reactor provided with efficient agitation. The cooling mechanisms discussed above are also effective with such a reactor. As material progresses through such a reactor, the amount of polymer continuously increases, the amount of monomer decreases, (via polymerization and vaporization losses), and the temperature progressively increases from inlet to outlet stages.

The partially polymerized mixture exiting the final reactor is subjected to one or more stages of devolatilization to remove the remaining unreacted monomers and solvent. Such devolatilization is conducted in a known manner in any desired devolatilizer such as a wiped film, or falling strand, or extruder type. The devolatilization treatment is generally conducted at temperatures of from about 200 to 280° C., at reduced pressures of from 0.01 to 700 mm Hg absolute, preferably at from about 210 to 250° C., and a pressure of from 2 to 200 mm Hg abs. The product of the devolatilization stage is a polymer composition with a residual monomer and oligomer levels reduced to less than about 0.2% by weight.

After removal of the devolatilized polymer from the devolatilization stage generally in the form of a melt, it is formed into strands or other shapes by the use of stranding dies or other conventional means and thereafter cooled and cut or pelleted into the desired final size and stored or packaged for shipment. The final operations can all be conducted in conventional manner through the use of known equipment and devices.

The inventive ABS polymer is characterized by the following features:

(i) the diameter of the rubber particles (weight average) is 0.3 to 0.7 microns, (ii) the ratio between the weight average particle diameter ($D_w$) and the number average particle diameter ($D_n$) of the rubber is at most 2.5, (iii) the glass transition temperature of the rubber is at most −85° C., (iv) the content of the rubber is about 10 to 16 percent relative to the weight of the ABS polymer, (v) the molecular weight of the SAN matrix (number average molecular weight) is greater than 65,000, preferably greater than 70,000 grams/mole, (vi) the content of residual oligomers is less than 0.2%.

The direct consequence of the material parameters defining the inventive ABS polymer is the following set of characteristic properties, including:

(i) shear viscosity at 246° C. @ 100 sec-1 of less than 1600 Pa-s, (ii) tensile modulus of at least 2.2 GPa, (iii) elongation-to-fail (ETF) greater than 40%, (iv) impact strength, Izod, greater than 25 kJ/m2

(v) RME slope at strain=2 greater than 100 kPa, and (iv) RME strain at necking onset greater than 3.0.

The particle diameter of the rubber may be measured by a sedimentation-light scattering technique. The glass transition temperature ($T_g$) of the rubber may be measured by dynamic mechanical analysis in tensile mode. The rubber content may be determined by FTIR, calibrated for the appropriate butadiene copolymer content. The molecular weight of the matrix is measured by gel permeation chromatography calibrated to the appropriate AN content. The content of the residual oligomers (dimers and trimers) may be measured by gas chromatography coupled with a mass spectrometer.

The shear viscosity values in the context of the present invention are determined by standard capillary rheometer. The tensile modulus and elongation-to-fail values are determined on bars cut from extruded strips in the cross machine direction. These strips are 50 mils thick and are extruded under conditions that give a residual orientation in the machine direction of 10 to 25% (as measured by oven shrinkage). Tensile properties were determined in accordance with ASTM D648, except that the gage section of the bars is 0.05×0.50×1.00 inches. Impact strength, Izod, is measured on 4 mm ISO molded bars according to ISO 180-1993(E). Melt stress-strain is measured on a Meisner type rheometer (a product of Rheometric Scientific, Inc.) in uniaxial extension at 170° C. and at 0.1 sec-1 Hencky strain rate; these conditions are typical for thermoforming of ABS materials. The slope of the stress/strain curve at a Hencky strain of 2 (draw ratio of 7.4) is selected as this strain is typical in deep draw parts and the melt stability must be maintained to at least this degree of strain. The melt Hencky strain at which visible necking of the specimen occurs is an indication of loss of stability of the material and of the maximum draw ratio the material is likely to be capable of.

The set of properties that characterize the inventive ABS polymer (herein "critical properties") is not shared by corresponding materials which are presently available in commerce. While increased rubber content would result in higher elongation-to-fail, Izod impact strength and melt stress growth, this is typically associated with lowered modulus and melt strain limit and an increase in shear viscosity. An increase in the molecular weight of the grafted phase results in higher values of ETF, Izod impact strength and melt strain hardening. It also results in an increase in shear viscosity. Increased size of the rubber particles yields higher ETF values, yet is accompanied by reduced values of Izod impact strength, tensile modulus, and melt strain hardening.

Melt strain hardening, a parameter indicating stability, is measured in uni-axial extension on a Meisner-type rheometer (RME). The temperature is kept constant at 170° C. and the strain rate is constant at 0.1 sec$^{-1}$. The stress-strain curve is analyzed from its slope, or stress growth, at a Hensky strain of 2 (RME slope), as a measure of melt stability. The strain at which the deforming sample necks, or becomes non-uniform (RME strain at necking onset) is a measure of melt stability.

The table below represents the profile of the properties of several corresponding materials which are believed to be the currently leading commercial products. The values presented in bold numerals indicate shortcomings in comparison to the target properties. These are set in comparison to the ABS polymer of the present invention In the table: $D_w$-denotes the weight average particle diameter of the rubber particles; $D_n$-denotes the number average particle diameter of the rubber particles; the ratio $D_w/D_n$ denotes the size distribution; $T_g$-denoted glass transition temperature in ° C.

| Material | $D_w$ Microns | $D_w/D_n$ | Rubber Tg, C | % Rubber | Matrix Mn, g/mole | Residual oligomers, % |
|---|---|---|---|---|---|---|
| 1 | 0.32 | 1.9 | −74 | 13.6 | 65000 | >0.25 |
| 2 | <0.20 | <1.4 | >−80 | 11.5 | 67000 | NA |
| 3 | <0.20 | <1.4 | >−80 | 12.4 | 55000 | NA |
| 4 | 0.3–0.4 | ~2 | NA | 14.3 | 60000 | NA |
| 5 | 0.5 | >2.3 | −79 | 14.8 | 58000 | 0.25 |
| 6 | 0.74 | 2.00 | −81 | 12.8 | 64000 | 0.1* |
| 7 | 0.40 | 2.00 | −92 | 14.3 | 78000 | 0.1* |
| 8 | 0.47 | 2.10 | −86 | 14.3 | 75000 | 0.1* |

NA - data not available;
*approximate value

| Material | Viscosity Pa-s | Tensile Modulus Gpa | ETF, % | Izod, Kj/m2 | Melt Stress/Strain slope at strain = 2, kPa | Hencky Strain at Necking onset |
|---|---|---|---|---|---|---|
| 1 | 1520 | 2.39 | 78 | 40.0 | 52 | 2.3 |
| 2 | 1400 | 2.48 | 17 | 23.7 | 138 | 2.7 |
| 3 | 1500 | 2.51 | 31 | 23.6 | 0 | 1.7 |
| 4 | 1100 | 2.48 | 32 | 25.3 | 40 | 2.8 |
| 5 | 1497 | 1.73 | 26 | 20.3 | 36 | 2.9 |
| 6 | 1767 | 2.02 | 127 | 11.2 | 127 | 3.5 |
| 7 | 1532 | 2.25 | 45 | 31.0 | 245 | 3.5 |
| 8 | 1574 | 2.23 | 84 | 44.2 | 258 | 3.7 |

1 through 4 are current commercial products; 5 and 6 are products of typical continuous mass process; 7 and 8 represent the invention.

The preparation of the inventive ABS by the well known continuous mass polymerization process requires the modifications to the process that are noted herein.

The invention is further illustrated but is not intended to be limited by the following examples in which all parts and percentages are by weight unless otherwise specified.

EXAMPLES

Example 1

Comparative

ABS polymer was prepared by typical continuous mass as described below. The product contained 13.7% by weight rubber having a weight average particle diameter (Dw) of 0.74 micron. The product contained 28% by weight acrylonitrile, the balance being styrene in the polystyrene-acrylonitrile matrix. The preparation entailed using a system of two stirred reactors positioned in series. A feed stream continuously introduced to the first one-liter reactor at a rate of 710 gram/hour, had the following composition (percent by weight):

10% polybutadiene rubber,
40.6% styrene,
23.3% acrylonitrile,
26% inert organic solvent, and
0.038% t-butyl peroxyneodecanoate.

The temperature in the first reactor was 80° C.

The reaction mixture was then fed to the second two-liter reactor along with a separate, second feed stream, which was simultaneously and continuously fed thereto at a feed rate of 178 gram/hour. The second feed stream contained (percent by weight):

69.9% styrene,
4% acrylonitrile,
24.6% inert organic solvent,
0.18% t-butyl ethylhexyl monoperoxy carbonate (chemical initiator),
0.12% t-dodecyl mercaptan, and
1.2% of a stabilizer.

The stabilizer is believed to have no criticality in the present context. The temperature in the second reactor was 145° C. The reaction mixture in the second reactor was reacted and then continuously fed to a one-staged devolatilizer at 240° C. and under 10 mm Hg. The structure and properties of the resulting ABS material are shown below.

TABLE 1

| | |
|---|---|
| % Rubber | 12.8 |
| $D_w$, microns | 0.74 |
| $D_w/D_n$ | 2.00 |
| Rubber Tg, ° C. | −81 |
| % AN, PSAN | 27.8 |
| Mw, g/mole | 149,000 |
| Mn, g/mole | 64,000 |
| Residual SAN Oligomers, % | 0.1 |
| Shear Viscosity, Pa-sec | 1767 |
| Modulus, Gpa | 2.02 |
| Elongation-to-fail, % | 127 |
| Impact strength, Izod, kJ/m$^2$ | 11.2 |
| RME Slope @ strain =2, kPa | 127 |
| RME Strain at necking onset | 3.5 |

Example 2

ABS polymer was prepared by the inventive process. The product contained 14.3% by weight rubber having a weight average particle size (Dw) of 0.40 micron. The product contained 26.2% by weight acrylonitrile, the balance being styrene in the polystyrene-acrylonitrile matrix. The preparation entailed using a system of two stirred reactors positioned in series. A feed stream continuously introduced to the first one-liter reactor at a rate of 520 gram/hour, had the following composition (percent by weight):

8.1% polybutadiene rubber,
48.6% styrene,
20.1% acrylonitrile,
23.2% inert solvent, and
0.023% t-butyl peroxyneodecanoate.

The temperature in the first reactor was 80° C.

The reaction mixture was then fed to the second two-liter reactor along with a separate, second feed stream, which was simultaneously and continuously fed thereto at a feed rate of 27 gram/hour. The second feed stream contained (percent by weight):

68.2% styrene,
13.5% acrylonitrile,
12.2% corn oil, and
6.1% of a stabilizer.

Neither the stabilizer nor the corn oil is believed to be critical in the present context. The temperature in the second reactor was 150° C. The reaction mixture in the second reactor was reacted and then continuously fed to a one-stage devolatilizer at 240° C. and under 10 mm Hg. The properties of the resulting ABS material are shown below.

TABLE 2

| | |
|---|---|
| % Rubber | 14.3 |
| $D_w$ | 0.40 |
| $D_w/D_n$ | 2.00 |
| Rubber Tg, ° C. | 92 |
| % AN, PSAN | 26.2 |
| Mw, g/mole | 181,000 |
| Mn, g/mole | 78,000 |
| Residual SAN Oligomers, % | 0.1 |
| Shear Viscosity, Pa-sec | 1532 |
| Modulus, Gpa | 2.25 |
| Elongation-to-fail, % | 45 |
| Impact strength, Izod, kJ/m2 | 31.0 |
| RME Slope @ strain = 2, kPa | 245 |
| RME Strain at necking onset | 3.5 |

Example 3

ABS polymer was prepared by the inventive process. The product contained 14.3% by weight rubber having a weight average particle size (Dw) of 0.47 micron. The product contained 26.2% by weight acrylonitrile, the balance being styrene in the polystyrene-acrylonitrile matrix. The preparation entailed using a system of two stirred reactors positioned in series. A feed stream continuously introduced to the first one-liter reactor at a rate of 520 gram/hour, had the following composition (percent by weight):

8.1% polybutadiene rubber,
48.6% styrene,
20.1% acrylonitrile,
23.2% inert solvent, and
0.023% t-butyl peroxyneodecanoate.

The temperature in the first reactor was 80° C.

The reaction mixture was then fed to the second two-liter reactor along with a separate, second feed stream, which was simultaneously and continuously fed thereto at a feed rate of 27 gram/hour. The second feed stream contained (percent by weight):

66.5% styrene,
13.2% acrylonitrile,
11.9% corn oil,
2.4% silicone oil, and
6.0% of a stabilizer.

Neither the stabilizer nor the corn oil is believed to be critical in the present context. The temperature in the second reactor was 150° C. The reaction mixture in the second reactor was reacted and then continuously fed to a one-stage devolatilizer at 240° C. and under 10 mm Hg. The properties of the resulting ABS material are shown below.

TABLE 3

| | |
|---|---:|
| % Rubber | 14.3 |
| $D_w$ | 0.47 |
| $D_w/D_n$ | 2.10 |
| Rubber Tg, ° C. | −86 |
| % AN, PSAN | 26.2 |
| Mw, g/mole | 182,000 |
| Mn, g/mole | 75,000 |
| Residual SAN Oligomers, % | 0.1 |
| Shear Viscosity, Pa-sec | 1574 |
| Modulus, Gpa | 2.23 |
| Elongation-to-fail, % | 84 |
| Impact strength, Izod, kJ/m2 | 44.2 |
| RME Slope @ strain = 2, kPa | 258 |
| RME Strain at necking onset | 3.7 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A continuous mass polymerization process for making ABS polymer comprising (i) continuously charging a reaction mixture into a first in a series of continuous stirred reactors and under conditions promoting polymerization, the mixture comprising diene rubber in solution of a mixture of monomers, inert solvent and chemical initiator in an amount of 0.02 to 0.05 percent relative to the weight of said reaction mixture to form a first reaction mixture in which the rubber is in the form of a dispersed phase and has a weight average particle diameter of 0.3 to 0.7 microns, (ii) transferring said first reaction mixture into at least one subsequent continuous stirred reactor of said series, optionally along with additional mixture of monomers, and with no addition of chemical initiator, said subsequent reactor operating at a temperature of 130 to 155° C. to form a product, and (iii) transferring the product obtained in (ii) to a devolatilizing unit, and (iv) devolatilizing said product, said mixture of monomers, both occurrences containing monoalkenyl aromatic monomers and ethylenically unsaturated nitrile monomers.

2. In the continuous mass polymerization process for making ABS polymer in a series of reactors under conditions promoting polymerization, the improvement comprising (i) continuously charging a reaction mixture into a first in a series of continuous stirred reactors, said reaction mixture containing an inert solvent, diene rubber in solution of a mixture of monomers containing at least one monoalkenyl aromatic monomer and at least one ethylenically unsaturated nitrile monomer, and a chemical initiator in an amount of 0.02 to 0.05 percent relative to the weight of said reaction mixture to form a first reaction mixture in which rubber dispersed phase has a weight average particle diameter of 0.3 to 0.7 microns, (ii) operating each continuous stirred reactor subsequent to said first reactor in said series with no additional chemical initiator and at a temperature of 130 to 155° C. to produce an ABS polymer, and (iii) devolatilizing said ABS polymer.

* * * * *